United States Patent
Onaizi (10) Patent No.: US 12,397,278 B2
(45) Date of Patent: Aug. 26, 2025

(54) PROCESS FOR REMOVING HYDROGEN SULFIDE FROM SOUR GASES

(71) Applicant: KING FAHD UNIVERSITY OF PETROLEUM AND MINERALS, Dhahran (SA)

(72) Inventor: Sagheer A. Onaizi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 492 days.

(21) Appl. No.: 17/900,279

(22) Filed: Aug. 31, 2022

(65) Prior Publication Data
US 2024/0082809 A1    Mar. 14, 2024

(51) Int. Cl.
*B01J 20/04* (2006.01)
*B01D 53/02* (2006.01)
(Continued)

(52) U.S. Cl.
CPC .......... *B01J 20/041* (2013.01); *B01D 53/025* (2013.01); *B01D 53/06* (2013.01); *B01J 20/0237* (2013.01);
(Continued)

(58) Field of Classification Search
CPC .. B01J 20/041; B01J 20/0237; B01J 20/0248; B01J 20/226; B01J 20/28007;
(Continued)

(56) References Cited

U.S. PATENT DOCUMENTS

| | | | | |
|---|---|---|---|---|
| 4,397,953 A | * | 8/1983 | Guazzone | .............. C12M 21/04 435/801 |
| 5,079,203 A | * | 1/1992 | Pinnavaia | ............ B01D 53/864 502/80 |

(Continued)

FOREIGN PATENT DOCUMENTS

| | | |
|---|---|---|
| CN | 101648108 B | 1/2013 |
| WO | 2007/041553 A1 | 4/2007 |
| WO | 2020/252335 A1 | 12/2020 |

OTHER PUBLICATIONS

Othman, et al. ; Selectivity of layered double hydroxides and their derivative mixed metal oxides as sorbents of hydrogen sulfide ; Journal of Hazardous Materials vols. 254-255 ; pp. 221-227 ; Jun. 15, 2013 ; Abstract Only ; 2 Pages.
(Continued)

*Primary Examiner* — In Suk C Bullock
*Assistant Examiner* — Jessica M Whitman
(74) *Attorney, Agent, or Firm* — Oblon, McClelland, Maier & Neustadt, L.L.P.

(57) ABSTRACT

A process for removing hydrogen sulfide ($H_2S$) from a $H_2S$-containing gas composition includes charging a liquid to a reactor under continuous agitation and dispersing particles of a CuMgAl compound in the liquid to form a CuMgAl complex mixture. The CuMgAl compound includes CuMgAl layered triple hydroxides and CuMgAl layered triple oxides. The method further includes introducing the $H_2S$-containing gas composition to the reactor containing the CuMgAl complex mixture under continuous agitation and passing the $H_2S$-containing gas composition through the CuMgAl complex mixture. In addition, the method includes adsorbing and removing $H_2S$ from the gas composition by the CuMgAl complex mixture to form a purified gas composition.

18 Claims, 5 Drawing Sheets

(51) Int. Cl.
  *B01D 53/06* (2006.01)
  *B01J 20/02* (2006.01)
  *B01J 20/22* (2006.01)
  *B01J 20/28* (2006.01)
  *B01J 20/30* (2006.01)

(52) U.S. Cl.
  CPC ......... *B01J 20/0248* (2013.01); *B01J 20/226* (2013.01); *B01J 20/28007* (2013.01); *B01J 20/3071* (2013.01); *B01J 20/3078* (2013.01); *B01D 2253/1124* (2013.01); *B01D 2253/304* (2013.01); *B01D 2256/24* (2013.01); *B01D 2256/245* (2013.01); *B01D 2257/304* (2013.01)

(58) Field of Classification Search
  CPC . B01J 20/3071; B01J 20/3078; B01D 53/025; B01D 53/06; B01D 2253/1124; B01D 2253/304; B01D 2256/24; B01D 2256/245; B01D 2257/304
  See application file for complete search history.

(56) References Cited

U.S. PATENT DOCUMENTS

| | | | |
|---|---|---|---|
| 5,358,701 A * | 10/1994 | Pinnavaia | B01J 20/3433 |
| | | | 423/242.1 |
| 6,277,329 B1 | 8/2001 | Evans | |
| 10,030,201 B1 * | 7/2018 | Sunkara | C10G 25/02 |
| 10,704,387 B2 | 7/2020 | Perkins et al. | |
| 11,311,855 B2 | 4/2022 | Tsapatsis et al. | |
| 2017/0333826 A1 * | 11/2017 | Van Dijk | B01J 20/3466 |
| 2018/0311642 A1 * | 11/2018 | Tsapatsis | B01D 53/52 |
| 2020/0197865 A1 * | 6/2020 | Onaizi | B01J 27/055 |

OTHER PUBLICATIONS

Cheng, et al. ; MgAlFeCu mixed oxides for SO2 removal capacity: Influence of the copper and aluminum incorporation method ; Catalysis Communications vol. 23 ; Jun. 5, 2012 ; Abstract Only ; 1 Page.

* cited by examiner

PROCESS FOR REMOVING HYDROGEN SULFIDE FROM SOUR GASES

TECHNICAL FIELD

The present disclosure is directed to a process for removing hydrogen sulfide ($H_2S$) from a $H_2S$-containing fluid, and particularly, to the process for removing $H_2S$ from a gaseous composition with a CuMgAl compound.

DESCRIPTION OF RELATED ART

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

As one of the most dangerous toxic and flammable gas, $H_2S$ can cause possible life-threatening situations at a concentration as low as 350 ppm for a short-term exposure. In addition to its toxicity, health and safety issues, this colorless gas is also highly corrosive. Accordingly, the maximum concentration of $H_2S$ in marketable natural gas is 4 ppmv at standard temperature and pressure [Mandald, B.; Bandyopadhyay, S. S., Simultaneous absorption of $CO_2$ and $H_2S$ into aqueous blends of N-methyldiethanolamine and diethanolamine, Environ Sci Technol., 2006, 40(19):6076-84], which is considered to be the threshold value above which the natural gas needs to be sweetened in order to reduce the $H_2S$ concentration. Localized corrosion and stress cracking is common in pipes/units handling $H_2S$-containing streams. It has been reported that the presence of $H_2S$ even at low concentrations can cause a substantial adverse impact on carbon steel [Rebak, R. B.; Perez T. E., Effect of Carbon Dioxide and Hydrogen Sulfide on the Localized Corrosion of Carbon Steels and Corrosion Resistant Alloys., 2017, NACE International Conference: New Orleans, Louisiana, USA]. Therefore, $H_2S$ must be effectively scavenged from sour gases to not only mitigate its safety and operational issues but also reduce its damage to the pipelines, valves and surfaces of process equipment.

Several technologies and methods have been developed industrially for sweetening (e.g., removing $H_2S$) hydrocarbons and natural gas. These technologies and methods mainly involve the use of amine-based solutions, carbonaceous materials, or metal salts as adsorbents for the adsorption of $H_2S$. However, these technologies and methods suffer from high production costs, corrosivity problems associated with the amine-based solutions, lack of selectivity, and by-product generation, etc. Thus, efforts have been taken to develop tools and methods of scavenging $H_2S$ from natural gas and other sour gases.

U.S. Pat. No. 9,587,181 to Lehrer et al. (Lehrer) discloses the use of water-soluble aldehydes and transition metal salts for $H_2S$ scavenging present in aqueous fluids. Garrett et al. [Garrett, R. L.; Clark, R. K.; Carney, L. L.; Grantham, C. K., Chemical scavengers for sulfides in water-base drilling fluids, Journal of Petroleum Technology., 1979, 31(6):787-796, incorporated herein by reference in its entirety] uses zinc compounds (e.g., zinc carbonate and zinc oxide) as $H_2S$ scavengers. U.S. Pat. No. 9,480,946 to Ramachandran et al. (Ramachandran) discloses the use of metal carboxylate salts as $H_2S$ scavengers in both dry and wet hydrocarbon gas systems. Divalent iron salts have shown capability to absorb $H_2S$ from drilling mud as described in U.S. Pat. No. 6,365,053. Copper carbonate is also able to remove $H_2S$ from gaseous streams as disclosed by Dyke and Wagner in U.S. Pat. No. 3,506,572. U.S. Pat. No. 6,960,330 to Cox (Cox) describes a method for reducing $H_2S$ contamination by adding Fe-MGDA and a peroxide (e.g., hydrogen peroxide) to a $H_2S$-containing medium. Browning et al. (described in U.S. Pat. No. 3,928,211) reveals that zinc and copper compounds (e.g., $Zn(OH)_2$, $CuCO_3$, and $ZnCO_3$) can reduce the concentration of $H_2S$ (in the form of soluble sulfides) from more than 1,100 ppm to about 50 ppm.

U.S. Pat. No. 5,700,438 to Miller (Miller) discloses a process for $H_2S$ and mercaptans removal from gas streams by contacting a $H_2S$-containing gas stream with an aqueous solution of copper complex of a water-soluble amine. The reaction of the copper complex of the water-soluble amine with $H_2S$ generates water-insoluble copper sulfide and releases the water-soluble amine. U.S. Pat. No. 4,153,547 A to McLean (McLean) discloses a method for the desulfurization of well water using acidified copper sulfate. WO Pat. No. 2015116864 A1 to Martin (Martin) describes the use of a family of metals chelates for hydrogen sulfide scavenging from asphalt. EP Pat. 0,257,124 A1 to McManus and Kin (McManus and Kin) discloses the use of an aqueous chelated polyvalent metal catalyst solution for $H_2S$ scavenging. U.S. Pat. No. 4,478,800 A to Willem et al. (Willem) relates to a method for the removal of sulfur compounds from gaseous streams. The method involves passing a $H_2S$-containing gaseous stream over an inert support containing metal oxides. The supported metal oxides can react with $H_2S$ and generate metal-sulfur compounds.

Oakes discloses in U.S. Pat. No. 4,473,115 a method for reducing the concentration of $H_2S$ present in subterranean well fluids through the injection of a stabilized solution of chlorine dioxide. The mixing of the said solution with a drilling mud can further reduce the $H_2S$ content in a $H_2S$-contaminated drilling mud. U.S. Pat. No. 4,805,708 to Matza et al. (Matza) discloses a method for controlling the content of zinc-based $H_2S$ scavenger added to oil-based drilling fluids. U.S. 9,587,181 B2 to Lehrer et al. (Lehrer) discloses the use of $H_2S$ scavengers based on transition metal salts (e.g., zinc carboxylate or iron carboxylate) and at least one water-soluble aldehyde/aldehyde precursor (e.g., ethylene glycol hemiformal) for $H_2S$ removal from natural gas, crude oil, and aqueous fluids (e.g., produced water streams) and mixed streams of natural gas-crude oil-water.

Davidson et al. [Davidson, E.; Hall, J.; Temple, C., An environmentally friendly highly effective hydrogen sulfide scavenger for drilling fluids, SPE Drilling & Completion., 2004, 19(4):229-234] describes the application of iron-gluconate for $H_2S$ scavenging from drilling fluids. Davidson et al. also discloses the $H_2S$ iron-gluconate scavenger in U.S. Pat. No. 6,746,611 B2.

U.S. Pat. No. 6,881,389 to Paulsen et al. (Paulsen) proposes a process for the removal of hydrogen sulfide and/or carbon dioxide from natural gas via absorption and disassociation utilizing a seawater contact system. U.S. Pat. No. 7,235,697 to Muller et al. (Muller) discloses a process for producing thiols, thioethers and disulfides by reacting olefins with hydrogen sulfide in the presence of water and carbon dioxide. U.S. Pat. No. 6,946,111 to Keller et al. (Keller) discloses a process for the $H_2S$ removal from a gas stream via the reaction of $H_2S$ with $O_2$ over a suitable catalyst. U.S. Pat. No. 5,215,728 to McManus (McManus) discloses a method for $H_2S$ scavenging using a polyvalent metal redox absorption solution.

Additionally, U.S. Pat. No. 6,444,185 to Nougayrede et al. (Nougayrede) discloses a process for the simultaneous desulfurization of sulfurous compounds such as $H_2S$, $SO_2$, COS and/or $CS_2$, where these sulfur-containing gases are oxidized and hydrolyzed at a temperature ranging from 180 to 700° C. U. S. 2015/0034319 A1 to Tylor (Tylor) discloses the use of triazine for $H_2S$ scavenging. Triazine and glyoxal are among the most widely used $H_2S$ scavengers in oil and gas industries. However, the reaction of triazine and glyoxal with $H_2S$ is slow when they are used in downhole injection applications. Another limitation of triazine and glyoxal is their low thermal stability. Furthermore, triazines components have high scaling tendency, which is undesirable. U.S. Pat. No. 6,495,117 to Lynn (Lynn) describes a process for the recovery of elemental sulfur from $H_2S$-containing gases by treating the $H_2S$-containing gases in a series of liquid-phase reactors.

Practical approaches have been developed in the art, however these approaches often involve (i) complicated homogenous systems, (ii) sophisticated chemical agents, e.g., highly functionalized chelating agents, flammable oxidizing agents and costly stabilizers, and (iii) restricted application conditions, e.g., limited pH ranges, particular temperature ranges, and certain pressure requirements. Hence, there is a need for improved desulfurization and/or sweetening techniques, and apparatuses and protocols for such treatment.

In view of the forgoing, one objective of the present disclosure is to provide a process for removing $H_2S$ from a $H_2S$-containing gas composition. A further objective of the present disclosure is to provide a method of making the CuMgAl compound, and its application in a continuous stirred tank process for the desulfurization of sour gases and liquid hydrocarbon fuels. In some aspects, the CuMgAl compound incudes a CuMgAl layered triple hydroxide, a CuMgAl layered triple oxide, or a mixture thereof.

SUMMARY

In an exemplary embodiment, a process for removing hydrogen sulfide ($H_2S$) from a $H_2S$-containing gas composition is described. The process for removing $H_2S$ from a $H_2S$-containing gas composition includes charging a liquid to a reactor under continuous agitation. The process further includes dispersing particles of a CuMgAl compound in the liquid to form a CuMgAl complex mixture. In addition, the process includes introducing the $H_2S$-containing gas composition to the reactor containing the CuMgAl complex mixture under continuous agitation and passing the $H_2S$-containing gas composition through the CuMgAl complex. Furthermore, the process also includes adsorbing and removing $H_2S$ from the gas composition by the CuMgAl complex mixture to form a purified gas composition.

In some embodiments, the CuMgAl complex mixture is continuously agitated.

In some embodiments, the CuMgAl compound includes a $Cu_xMg_{(1-x-y)}Al_y$ layered triple hydroxide, a $Cu_xMg_{(1-x-y)}Al_y$ layered triple oxide, or a mixture of these two in any proportion. In one embodiment, x is any value of from 0.5 to 0.9. In another embodiment, y is any value of from 0.1 to 0.5. In a further embodiment, $0<(x+y)<1$.

In some embodiments, the CuMgAl compound is a $Cu_{0.68}Mg_{0.068}Al_{0.252}$ layered triple hydroxide. In one embodiment, x=0.68 and y=0.252.

In some embodiments, the CuMgAl compound is a $Cu_{0.68}Mg_{0.068}Al_{0.252}$ layered triple oxide. In one embodiment, x=0.68 and y=0.252.

In some embodiments, the CuMgAl compound has a delaminated structure comprising charged crystalline particles. In one embodiment, a distance between laminated layers is in a range of 0.5 to 5 nm.

In some embodiments, the CuMgAl compound is supported on at least one support selected from the group consisting of an alumina, a carbon nanotube, an activated carbon, a metal organic framework (MOF), a zeolitic imidazolate framework (ZIF), and a covalent organic polymer (COP).

In some embodiments, wherein the CuMgAl compound supported on the support comprises at least 15 wt. % alumina, based on a total weight of the CuMgAl compound and the support.

In some embodiments, the particles of the CuMgAl compound have a mean particle size in a range of 5 to 150 nm.

In some embodiments, the particles of the CuMgAl compound are on at least one support selected from the group consisting of an exterior surface of a support and within pores of a porous support.

In some embodiments, the liquid is an aqueous media including tap water, ground water, distilled water, deionized water, saltwater, hard water, fresh water, and wastewater.

In some embodiments, the reactor is a stirred tank reactor in the form of a vertical cylindrical reactor containing at least one propeller agitator disposed therein. In some embodiments, the vertical cylindrical reactor has a bottom portion, a vertically oriented cylindrical body portion and a top portion. In some embodiments, the bottom portion is cone shaped or pyramidal. In some embodiments, a plurality of recirculation tubes fluidly connects the bottom portion of the vertical cylindrical reactor with the body portion of the vertical cylindrical reaction.

In some embodiments, the reactor further comprises a packed bed reactor, a slurry reactor, and a bubble column reactor.

In some embodiments, the reactor is a stirred tank reactor.

In some embodiments, the $H_2S$-containing gas composition is at least one selected from the group consisting of natural gas, biogas, and refinery gas.

In some embodiments, the $H_2S$-containing gas composition further comprises at least one hydrocarbon selected from the group consisting of methane, ethane, ethylene, propylene, propane, butane, butene, butadiene, and isobutylene.

In some embodiments, the hydrocarbon is methane.

In some embodiments, the $H_2S$ is present in the gas composition at a concentration in a range of 10 to 200 parts per million by volume (ppmv) based on a total volume of the gas composition.

In some embodiments, the $H_2S$-containing gas composition is introduced to the reactor at a rate of 0.4 to 2.0 milliliters per minute (mL/min) per milligram of the CuMgAl compound.

In some embodiments, the CuMgAl compound is present in the liquid at a concentration in a range of from 0.5 to 2 milligrams per milliliter (mg/mL).

In some embodiments, the CuMgAl complex mixture is in contact with the $H_2S$-containing gas composition at a temperature in a range of from 15 to 40° C.

In some embodiments, the CuMgAl complex mixture is in contact with the $H_2S$-containing gas composition under a pressure of 0.9 to 1.2 bar.

In another exemplary embodiment, the process for removing $H_2S$ from a $H_2S$-containing gas composition includes contacting the $Cu_{0.68}Mg_{0.068}Al_{0.252}$ layered triple hydroxide present in the aqueous media at a concentration of 1 mg/mL with the gas composition. In some embodiments, the gas composition contains 100 ppmv of $H_2S$. In some embodiments, the gas composition is introduced at a rate of 80 mL/min into the stirred tank reactor. In some embodiments, the process has a breakthrough time of from 33 to 43 hours. In some embodiments, the process also has a saturation time of from 58 to 68 hours.

In yet still another exemplary embodiment, the process for removing $H_2S$ from a $H_2S$-containing gas composition includes contacting the $Cu_{0.68}Mg_{0.068}Al_{0.252}$ layered triple oxide present in the aqueous media at a concentration of 1 mg/mL with the gas composition. In some embodiments, the gas composition contains 100 ppmv of $H_2S$. In some embodiments, the gas composition is introduced at a rate of 80 mL/min into the stirred tank reactor. In some embodiments, the process has a breakthrough time of from 22 to 32 hours. In some embodiments, the process also has a saturation time of from 27 to 37 hours.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the following description, it is understood that other embodiments may be utilized, and structural and operational changes may be made without departure from the scope of the present embodiments disclosed herein.

Embodiments of the present disclosure will now be described more fully hereinafter with reference to the accompanying drawings, in which some, but not all embodiments of the disclosure are shown. In the drawings, like reference numerals designate identical or corresponding parts throughout the several views.

Furthermore, the terms "approximately," "approximate," "about," and similar terms generally refer to ranges that include the identified value within a margin of 20%, 10%, or preferably 5%, and any values there between.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g., 0 wt. %).

As used herein, the term "stirred tank reactor," "continuous stirred tank reactor," "mixed flow reactor," "continuous flow stirred tank reactor," and similar terms generally refer to a model for a chemical reactor in chemical engineering. The stirred tank reactor may have a liquid height and a rotating shaft containing a plurality of agitator blades.

The present disclosure describes a process for $H_2S$ scavenging from sour gases and liquids in a continuous stirred tank reactor to meet the growing needs of desulfurization on an industrial scale. The process optionally involves making and using a CuMgAl compound to react with the $H_2S$ in a heterogeneous mixture. In addition, the CuMgAl compound may be supported on a solid support and that is submerged and kept suspended in a liquid under mechanical agitation. The effectiveness of the said process and compound has been assessed by injecting a sour natural gas into a stirred tank reactor containing the CuMgAl compound dispersed in a liquid. The gas leaving the stirred tank reactor is continuously monitored and the concentration of $H_2S$ in the sweetened gas is continuously measured, enabling the construction of $H_2S$ breakthrough curves and the calculation of the amount of $H_2S$ scavenged According to a first aspect, the present disclosure relates to a process for removing hydrogen sulfide ($H_2S$) from a $H_2S$-containing gas composition. The process for removing $H_2S$ from a $H_2S$-containing gas composition involves (i) charging a liquid to a reactor optionally under continuous agitation, (ii) dispersing particles of a CuMgAl compound in the liquid to form a CuMgAl complex mixture, (iii) introducing the $H_2S$-containing gas composition to the reactor containing the CuMgAl complex mixture under continuous agitation and passing the $H_2S$-containing gas composition through the CuMgAl complex, and (iv) adsorbing and removing $H_2S$ from the gas composition by the CuMgAl complex mixture to form a purified gas composition.

Figure 1:
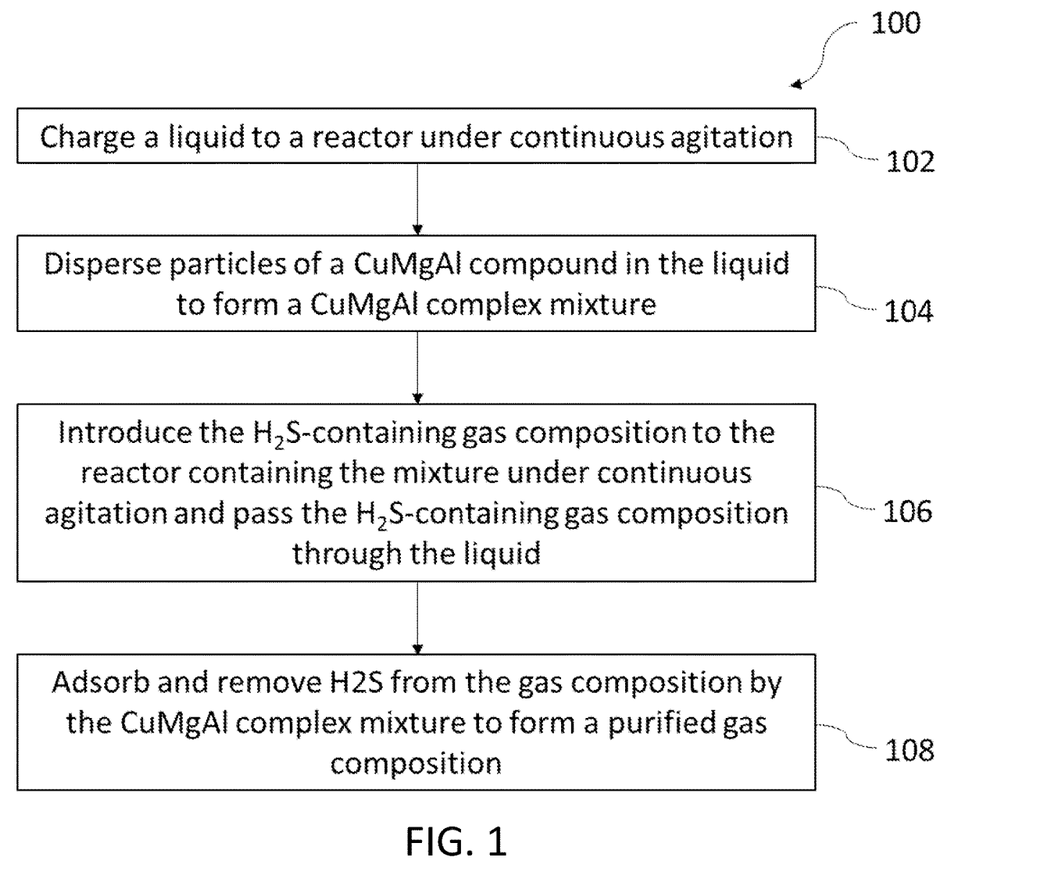
FIG. 1 is a schematic flow diagram of a process for removing hydrogen sulfide ($H_2S$) from a $H_2S$-containing gas composition, according to certain embodiments.

Referring to FIG. 1, a schematic flow diagram of a process for removing $H_2S$ from a $H_2S$-containing gas composition is illustrated. The method 100 is described with the reference to an XRD pattern of the CuMgAl layered triple oxides illustrated in FIG. 2. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes charging a liquid to a reactor under continuous agitation. In one exemplary embodiment, the liquid includes an aqueous media, an oil, an oil-in-water emulsion, and/or a water-in-oil emulsion. In one embodiment, the liquid is a sour oil. In a preferred embodiment, the liquid is a sour water. In a more preferred embodiment, the liquid is an aqueous media selected from the group consisting of tap water, ground water, distilled water, deionized water, saltwater, hard water, fresh water, and wastewater. For purposes of this description, the term "saltwater" may include saltwater with a chloride ion content of between about 6000 ppm and saturation, and is intended to encompass seawater and other types of saltwater including groundwater containing additional impurities typically found therein such as brackish water. The term "hard water" may include water having mineral concentrations between about 2000 mg/L and about 300,000 mg/L. The term "fresh water" may include water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in tap water, ground water, saltwater, wastewater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

In some embodiments, the liquid may further contain ethylene glycol, methanol, ethanol, propanol, isopropanol, n-butanol, ethyl acetate, pet ether, pentane, hexane(s), decalin, THF, dioxane, toluene, xylene(s), and/or o-dichlorobenzene. In some more other embodiments, the liquid may contain a minority fraction of, or even no, water.

In some preferred embodiments, the liquid comprises at least 50, 60, 70, 75, 80, 85, 90, 95, 96, 97, 97.5, 98, 99, 99.1, 99.5, or 99.9 wt. % $H_2O$, based upon a total weight of the liquid.

In a further exemplary embodiment, the reactor is at least one reactor selected from the group consisting of a stirred tank reactor, a packed bed reactor, a slurry reactor, and a bubble column reactor. In some embodiments, the reactor is a stirred tank reactor. In some embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some embodiments, the liquid occupies at least $1/20$, $1/10$, $3/10$, $1/2$, $2/3$, $4/5$, or $9/10$ of the reactor volume. In some embodiments, the liquid occupies no more than $10/11$, $9/10$, $4/5$, $2/3$, $1/2$, $3/10$, or $1/10$ of the reactor volume. In some embodiments, means of stirring or agitation may include magnetic stirring via magnetic spin bar, impellers, and ultrasonic waves. In certain embodiments, stirring or agitation may speed up the removal of $H_2S$.

In some embodiments, the reactor may be a vertical cylindrical reactor. In some embodiments, the reactor has a plurality of inlets and outlets for fluids at the bottom of the reactor. In some further embodiments, the reactor has a plurality of inlets and outlets for fluids at the top of the reactor. In a preferred embodiment the reactor has a plurality of inlets and outlets for liquid-suspended solids at the bottom of the reactor. In some further preferred embodiments, the reactor has a plurality of inlets for solids at the top of the reactor.

In order to ensure that the solid and suspended materials in the CuMgAl complex mixture remain in suspension it is preferred that a series of recirculation tubes fluidly connect a lower portion of the vertical cylindrical reactor (preferably a bottom portion) with an upper portion or body portion of the vertical cylindrical reactor that contains the CuMgAl complex mixture and/or liquid materials present in the reactor. The recirculation tubes may fluidly connect to a conical bottom portion of the vertical cylindrical reactor representing the bottommost portion thereof. A plurality of recirculation routes is preferable. One or more pumping mechanisms functions to draw the CuMgAl complex mixture from the bottom portion of the vertical cylindrical reactor and reintroduce the CuMgAl complex mixture in suspended form at an upper portion of the body portion of the vertical cylindrical reactor, preferably at a point that is below the uppermost liquid line present inside the vertical cylindrical reactor. During operation one or more recirculation pumps having an upstream connection to an outlet at the bottom of the vertical cylindrical reactor and a downstream connection to the body portion of the vertical cylindrical reactor functions to keep the suspended materials in a suspended state thereby eliminating formation of a hardened plug of solid material at the bottom of the vertical cylindrical reactor. Preferably there are at least four recirculation tubes, one for each of four quadrants defining the cross-section of the vertical cylindrical reactor. The inlet points in the body portion of the vertical cylindrical reactor at which the CuMgAl complex mixture is returned to the vertical cylindrical reactor are preferably at a height of less than one half the total height of the body portion of the vertical cylindrical reactor preferably at a height of 0.3-0.45 of the total height of the body portion of the vertical cylindrical reactor, e.g., measured from the bottommost portion of the cylindrical shape to the topmost portion of the cylindrical shape not including and cone or extender. During operation both mechanical agitation by a propeller and mechanical agitation by the recirculation tubes may occur such that the solids materials inside the CuMgAl complex mixture remain fully suspended without settling.

In some embodiments, the CuMgAl compound in the liquid may react with the $H_2S$ in the $H_2S$-containing gas composition optionally in the presence of a support to form a metal sulfide and a purified gas composition. In one embodiment, the purified gas composition may be accumulated in an upper region of a reactor. In yet another embodiment, the accumulated purified gas composition may be vented from the reactor through the outlets at the top of the reactor. In a preferred embodiment, the metal sulfide may be accumulated and settled in the liquid to a lower portion of the reactor. In a further preferred embodiment, the metal sulfide accumulated may be removed from the liquid through the outlets at the bottom of the reactor.

In some embodiments, the $H_2S$-containing gas composition may be passed into the CuMgAl complex mixture by a gas distributor within the body of CuMgAl complex mixture to distribute the gas composition in the form of small bubbles adjacent to a lower end of the reactor. The procedure may be operated as a continuous process or in intermittent manner and is particularly useful for scavenging operations. In some further embodiments, the $H_2S$-containing gas composition may be heated to a suitable temperature before passing through the CuMgAl complex mixture. The heated $H_2S$-containing gas composition is then in direct contact with the CuMgAl compound to convert substantially all $H_2S$ in the gas composition to metal sulfides.

In some embodiments, exhaustion of the capacity of the CuMgAl compound in the CuMgAl complex mixture to absorb and convert hydrogen sulfide to metal sulfides may be detected in any convenient manner and to form an exhausted reaction mixture containing metal sulfides. In some further preferred embodiments, the exhausted reaction mixture then is replenished with the CuMgAl complex mixture, or by the addition of the CuMgAl compound. Metal sulfides may be removed from the exhausted reaction mixture through the outlets at the bottom of the reactor.

At step 104, the method 100 includes dispersing particles of a CuMgAl compound in the liquid to form a CuMgAl complex mixture. In one exemplary embodiment, the CuMgAl compound includes a $Cu_xMg_{(1-x-y)}Al_y$ layered triple hydroxide, a $Cu_xMg_{(1-x-y)}Al_y$ layered triple oxide, or a mixture of these two in any proportion. In one embodiment, x is any value of from 0.5 to 0.9. In another embodiment, y is any value of from 0.1 to 0.5. In a further embodiment, 0<(x+y)<1.

In a preferred embodiment, the CuMgAl compound may be a $Cu_{0.68}Mg_{0.068}Al_{0.252}$ layered triple hydroxide, in which x=0.68 and y=0.252.

In a further preferred embodiment, the CuMgAl compound may be a $Cu_{0.68}Mg_{0.068}Al_{0.252}$ layered triple oxide, in which x=0.68 and y=0.252.

The crystalline structure of the CuMgAl compound is characterized by X-ray diffraction (XRD). In some embodiments, the XRD patterns are collected in a PANAlytical diffractometer (X'Pert PRO) equipped with a Cu—Kα radiation source ($\lambda$=0.15406 nm) for a 2θ range extending between 10 and 80°, preferably 20 and 70°, further preferably 30 and 60° at an angular rate of 0.005 to $0.04°s^{-1}$, preferably 0.01 to $0.03°s^{-1}$, or even preferably $0.02°s^{-1}$.

Figure 2:
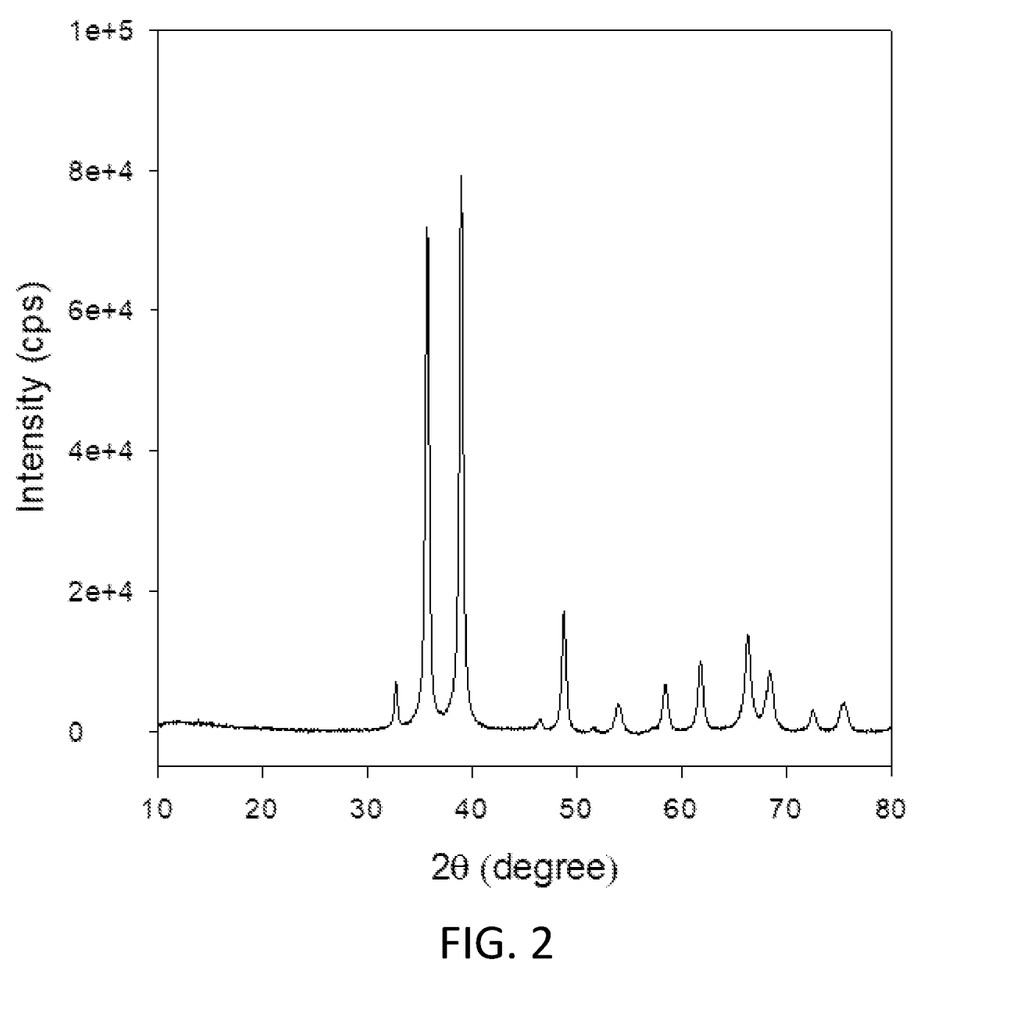
FIG. 2 illustrates an XRD pattern of CuMgAl layered triple oxides, according to certain embodiments.

In some embodiments, the $Cu_{0.68}Mg_{0.068}Al_{0.252}$ layered triple oxide has a first intense peak with a 2 theta (θ) value in a range of 30 to 37° in an X-ray diffraction (XRD) spectrum, as depicted in FIG. 2. In some further embodiments, the $Cu_{0.68}Mg_{0.068}Al_{0.252}$ layered triple oxide has a second intense peak with a 2θ value in a range of 37 to 42° in the XRD spectrum, as depicted in FIG. 2. In some preferred embodiments, the $Cu_{0.68}Mg_{0.068}Al_{0.252}$ layered triple oxide has at least a third peak with a 2θ value in a range of 45 to 70° in the XRD spectrum, as depicted in FIG. 2.

In another exemplary embodiment, the CuMgAl compound may be supported on at least one support selected from the group consisting of an alumina, a carbon nanotube, an activated carbon, a metal organic framework (MOF), a zeolitic imidazolate framework (ZIF), and a covalent organic polymer (COP), or a mixture of two or more of any of these.

In some embodiments, the support is aluminum oxide. In some embodiments, the aluminum oxide is gamma (γ) aluminum oxide. In some embodiments, the aluminum oxide may include, but are not limited to, alpha (α) aluminum oxide and beta (β) aluminum oxide. In some further embodiments, aluminum oxide generated after calcining the CuMgAl layered triple hydroxide may work as a support for CuMgAl layered triple oxide catalyst.

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon nanomaterial is at least one selected from the group consisting of graphene, graphene oxide, reduced graphene oxide, carbon nanotubes, carbon dots, and activated carbon.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise, they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanomaterial is activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanomaterial is carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In alternative embodiments, mixtures of types of particles are used.

As used herein, the term "zeolitic," "zeolite," "zeolitic materials," and similar terms generally refer to a material having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also comprises channels, channel intersections, and/or cages having dimensions in the range of 0.1-10 nm, preferably 0.2-5 nm, more preferably 0.2-2 nm. Water molecules may be present inside these channels, channel intersections, and/or cages. Zeolites which are devoid of aluminum may be referred to as "all-silica zeolites" or "aluminum-free zeolites". Some zeolites which are substantially free of, but not devoid of, aluminum are referred to as "high-silica zeolites". Sometimes, the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework. In some embodiments, the porous silicate and/or aluminosilicate matrix is a zeolitic material having a zeolite framework selected from the group consisting of ZSM-5, ZSM-8, ZSM-11, ZSM-12, ZSM-18, ZSM-23, ZSM-35 and ZSM-39.

The International Union of Pure and Applied Chemistry (IUPAC) states that a metal organic framework (MOF) is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and finally a coordination polymer is a coordination compound with repeating coordination entities extending in one, two, or three dimensions. A coordination entity is an ion or neutral molecule that is composed of a central atom, usually that of a metal, to which is attached a surrounding array of atoms or groups of atoms, each of which is called ligands. More succinctly, a metal organic framework is characterized by metal ions or clusters coordinated to organic ligands to form one-, two-, or three-dimensional structures. Typically, a MOF exhibits a regular void or pore structure. The nature of the void or pore structure, including properties or structural factors such as the geometry about the metal ions or clusters, the arrangement of the linkages between metal ions or clusters, and the number, identity, and spatial arrangement of voids or pores. These properties may be described as the structure of the repeat units and the nature of the arrangement of the repeat units. The specific structure of the MOF, which may include the void or pore structure is typically referred to as the MOF topology.

The metal-organic framework comprises a metal ion which is an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, these metal ions may be of any oxidation state $M^{+1}$, $M^{+2}$, $M^{+3}$, etc. In one or more embodiments, the metal ion is an ion of at least one metal selected from the group consisting of Zn, Cu, Fe, Ni, Co, Mn, Cr, Cd, Mg, Ca, and Zr.

In the formation of a metal organic framework, the organic ligands must meet certain requirements to form coordination bonds, primarily being multi-dentate, having at least two donor atoms (i.e. N—, and/or O—) and being neutral or anionic. The structure of the metal organic framework is also affected by the shape, length, and functional groups present in the organic linker. In certain embodiments, the metal organic framework of the present disclosure comprises anionic ligands as organic ligands. In one or more embodiments, the organic ligands may have at least two nitrogen donor atoms. For example, the organic ligands may be imidazolate-based, imidazole-derived or ligands similar to an imidazole including, but not limited to, optionally substituted imidazoles, optionally substituted benzimidazoles, optionally substituted imidazolines, optionally substituted pyrazoles, optionally substituted thiazoles, and optionally substituted triazoles. In a preferred embodiment, the metal organic framework of the present disclosure in any of its embodiments comprises 2-methylimidazole and 5-methylbenzimidazole as the organic ligands. 2-Methylimidazole and 5-methylbenzimidazole organic ligands have free nitrogen atoms that may each form a coordinative bond to the metal ions (e.g. Zn(II)) to produce a coordination network.

In one or more embodiments, the ligand comprises an imidazole of formula (I) and a benzimidazole of formula (II):

wherein $R_1$, $R_2$, $R_3$, $R_4$, $R_5$, $R_6$, $R_7$, and $R_8$ are each independently selected from the group consisting of a hydrogen, an optionally substituted alkyl, an optionally substituted cycloalkyl, an optionally substituted alkoxy, a hydroxyl, a halogen, a nitro, and a cyano. Preferably, $R_1$, $R_2$, $R_3$, $R_4$, $R_5$, $R_6$, $R_7$, and $R_8$ are each independently a hydrogen, an optionally substituted $C_1$-$C_3$ alkyl group, or an optionally substituted $C_3$-$C_6$ cycloalkyl group. More preferably, $R_1$, $R_2$, $R_3$, $R_4$, $R_5$, $R_6$, $R_7$, and $R_8$ are each independently a hydrogen or a methyl.

Exemplary imidazole-based ligands that may be applicable to the current disclosure include, but are not limited to, imidazole, 2-methylimidazole, 4-methylimidazole, 2-ethylimidazole, 2-isopropylimidazole, 4-tert-butyl-1H-imidazole, 2-ethyl-4-methylimidazole, 2-bromo-1H-imidazole, 4-bromo-1H-imidazole, 2-chloro-1H-imidazole, 2-iodoimidazole, 2-nitroimidazole, 4-nitroimidazole, (1H-imidazol-2-yl)methanol, 4-(hydroxymethyl)imidazole, 2-aminoimidazole, 4-(trifluoromethyl)-1H-imidazole, 4-cyanoimidazole, 3H-imidazole-4-carboxylic acid, 4-imidazolecarboxylic acid, imidazole-2-carboxylic acid, 2-hydroxy-1H-imidazole-4-carboxylic acid, 4,5-imidazoledicarboxylic acid, 5-iodo-2-methyl-1H-imidazole, 2-methyl-4-nitroimidazole, 2-(aminomethyl)imidazole, 4,5-dicyanoimidazole, 4-imidazoleacetic acid, 4-methyl-5-imidazolemethanol, 1-(4-methyl-1H-imidazol-5-yl)methanamine, 4-imidazoleacrylic acid, 5-bromo-2-propyl-1H-imidazole, ethyl-(1H-imidazol-2-ylmethyl)-amine, and 2-butyl-5-hydroxymethylimidazole. In preferred embodiments, the imidazole of formula (I) is 2-methylimidazole.

Exemplary benzimidazole-based ligands that may be applicable to the current disclosure include, but are not limited to, benzimidazole, 5-methylbenzimidazole, 2-methylbenzimidazole, 5-chlorobenzimidazole, 5-bromobenzimidazole, 5,6-dimethylbenzimidazole, 5-methoxybenzimidazole, 2-chlorobenzimidazole, 2-bromo-1H-benzimidazole, 6-bromo-1H-benzimidazole, 5-fluoro-1H-benzimidazole, 5-chloro-2-methylbenzimidazole, methyl benzimidazole-2-acetate, 1H-benzoimidazol-4-ol, 1H-benzimidazol-5-yl-methanol, 2-benzimidazolemethanol, 4-chloro-6-(trifluoromethyl)benzimidazole, 5-chloro-2-(trichloromethyl)benzimidazole, 5-cyanobenzimidazole, (2-benzimidazolyl)acetonitrile, (5-chloro-1H-benzimidazol-2-yl)methanol, 2-(chloromethyl)benzimidazole, 5-iodo-2-methylbenzimidazole, (5-chloro-1H-benzimidazol-2-yl)methylamine, 2-(aminomethyl)benzimidazole, 2-(6-chloro-1H-benzimidazol-2-yl)ethanol, 2-(1H-benzoimidazol-2-yl)-acetamide, (6-methoxy-1H-benzimidazol-2-yl)methanol, 5,6-dimethoxybenzimidazole, 2-(1H-benzoimidazol-2-yl)-ethylamine, 1-(5-methyl-1H-benzimidazol-2-yl)methanamine, 1-(5-methyl-1H-benzimidazol-2-yl)ethanamine, 2-benzimidazolepropionic acid, 2-(5-methyl-1H-benzimidazol-2-yl)ethanamine, 2-(3-hydroxy-N-propyl)-5-(trifluoromethyl)-benzimidazole, and N-methyl-1-(5-methyl-1H-benzimidazol-2-yl)methanamine. In preferred embodiments, the benzimidazole of formula (II) is 5-methylbenzimidazole.

In one or more embodiments, a molar ratio between the imidazole of formula (I) to the benzimidazole of formula (II) ranges from 1:1 to 1:4, preferably 2:3 to 2:7, more preferably 4:7 to 1:3, even more preferably 5:9 to 2:5, or about 1:2.

Metal organic frameworks comprising such imidazole or benzimidazole ligands are typically referred to as zeolitic imidazolate frameworks (ZIFs). In some embodiments, the metal organic framework is a zeolitic imidazolate framework. Examples of suitable metal organic frameworks include, but are not limited to isoreticular metal organic framework-3 (IRMOF-3), MOF-69A, MOF-69B, MOF-69C, MOF-70, MOF-71, MOF-73, MOF-74, MOF-75, MOF-76, MOF-77, MOF-78, MOF-79, MOF-80, DMOF-1-NH2, UMCM-1-NH2, MOF-69-80, ZIF-1, ZIF-2, ZIF-3, ZIF-4, ZIF-5, ZIF-6, ZIF-7, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-90, ZIF-91, ZIF-92, ZIF-93, ZIF-94, ZIF-96, ZIF-97, ZIF-100, ZIF-108, ZIF-303, ZIF-360, ZIF-365, ZIF-376, ZIF-386, ZIF-408, ZIF-410, ZIF-412, ZIF-413, ZIF-414, ZIF-486, ZIF-516, ZIF-586, ZIF-615, and ZIF-725.

In some embodiments, the porous support is aluminum oxide. In some embodiments, the aluminum oxide is gamma (γ) aluminum oxide.

In some embodiments, the porous support is present in the form of particles. In general, the porous support particles can be any shape known to one of ordinary skill in the art. Examples of suitable shapes the metal organic framework particles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, nanotubes, blocks, flakes, discs, granules, angular chunks, and mixtures thereof.

In some embodiments, the porous support particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of porous support particles having a different shape. As used herein, the term "non-uniform shape" refers to an average consistent shape that differs by more than 10% of the distribution of porous support particles having a different shape. In one embodiment, the shape is uniform and at least 90% of the porous support particles are spherical or substantially circular, and less than 10% are polygonal. In another embodiment, the shape is non-uniform and less than 90% of the porous support particles are spherical or substantially circular, and greater than 10% are polygonal.

In some embodiment, the porous support is in the form of particles having a mean particle size of 100 to 10,000 nm, preferably 125 to 9,500 nm, preferably 150 to 9,000 nm, preferably 175 to 8,500 nm preferably 200 to 8,000 nm, preferably 250 to 7,500 nm. In embodiments where the porous support particles are spherical, the particle size may refer to a particle diameter. In embodiments where the porous support particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the porous support particles have an anisotropic shape such as nanorods or nanotubes, the particle size may refer to a length of the nanorod or nanotube, a width of the nanorod or nanotube, or an average of the length and width of the nanorod or nanotube. In some embodiments, the particle size refers to the diameter of a sphere having an equivalent volume as the particle.

The hydrogen sulfide scavenger comprises particles of a CuMgAl compound. These particles of the CuMgAl compound are disposed on at least one support selected from the group consisting of an exterior surface of a support and within pores of a porous support. The particles of the CuMgAl compound can comprise any suitable CuMgAl layered triple hydroxide, CuMgAl layered triple oxide, or a mixture thereof.

In some embodiments, the CuMgAl compound is a $Cu_xMg_{(1-x-y)}Al_y$ layered triple hydroxide. In one embodiment, x is any value of from 0.5 to 0.9, preferably 0.55 to 0.8, more preferably 0.6 to 0.7, or 0.65. In one or more embodiments, y is any value of from 0.1 to 0.5, preferably 0.15 to 0.4, more preferably 0.2 to 0.3, or 0.25. In some other embodiments, $0<(x+y)<1$, $0.02<(x+y)<0.98$, preferably $0.04<(x+y)<0.96$, more preferably $0.06<(x+y)<0.94$, further preferably $0.08<(x+y)<0.92$, even more preferably $0.1<(x+y)<0.9$, or $0.2<(x+y)<0.8$. Other ranges are also possible.

In some embodiments, the CuMgAl compound may be a $Cu_xMg_{(1-x-y)}Al_y$ layered triple oxide. In one embodiment, x is any value of from 0.5 to 0.9, preferably 0.55 to 0.8, more preferably 0.6 to 0.7, or 0.65. In one or more embodiments, y is any value of from 0.1 to 0.5, preferably 0.15 to 0.4, more preferably 0.2 to 0.3, or 0.25. In some other embodiments, $0<(x+y)<1$, $0.02<(x+y)<0.98$, preferably $0.04<(x+y)<0.96$, more preferably $0.06<(x+y)<0.94$, further preferably $0.08<(x+y)<0.92$, even more preferably $0.1<(x+y)<0.9$, or $0.2<(x+y)<0.8$. Other ranges are also possible.

The CuMgAl particles may contain a single type of CuMgAl compound or may contain more than one type of CuMgAl compound. Multiple types of the CuMgAl particles may be used, which differ in various properties such as identity of composition of CuMgAl compound, size, shape, or other similar property. In general, the CuMgAl particles may have any suitable shape as described above. The shape may be uniform or non-uniform. In some embodiments, the CuMgAl compound has a delaminated structure comprising charged crystalline particles. In one or more embodiments, a distance between laminated layers is in a range of 0.5 to 5 nm, preferably 1 to 4.5 nm, preferably 1.5 to 4 nm, preferably 2 to 3 nm. In some embodiments, the particles of the CuMgAl compound have a mean particle size in a range of 5 to 150 nm, preferably 7.5 to 125 nm, preferably 10 to 100 nm, preferably 15 to 90 nm. Other ranges are also possible.

In still yet some other embodiments, the CuMgAl compound supported on the support comprises at least 15 wt. % alumina, at least 30 wt. %, at least 45 wt. %, at least 60 wt. %, at least 75 wt. %, at least 90 wt. %, based on a total weight of the CuMgAl compound and the support. In some further embodiments, a weight ratio of the CuMgAl compound to support is from 20:1 to 1:20, preferably 15:1 to 1:15, preferably 10:1 to 1:10, preferably 5:1 to 1:5, and more preferably 2:1 to 1:2. Other ranges are also possible.

In some embodiments, the CuMgAl complex mixture may comprise at least 5, 20, 40, 60, 80, 90, 95, or 99.9 wt. % CuMgAl compound, based on a total weight of solids in the CuMgAl complex mixture.

In some embodiments, the CuMgAl complex mixture may comprise at least 40, 50, 60, 70, 80, 90, 95, or 99.9 wt. % water, based on a total weight of liquids in the CuMgAl complex mixture.

In some embodiments, the CuMgAl compound is present in the liquid at a concentration in a range of from 0.5 to 2 (milligrams per milliliter) mg/mL, preferably 0.6 to 1.8 mg/mL, preferably 0.8 to 1.6 mg/mL, preferably 1.0 to 1.4 mg/mL, and more preferably 1.1 to 1.3 mg/mL.

At step 104, the method 100 further includes agitating the CuMgAl complex mixture continuously in a reactor. In some embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some embodiments, the CuMgAl complex mixture occupies at least 1/20, 1/10, 3/10, 1/2, 2/3, 4/5, or 9/10 of the reactor volume. In still yet some other embodiments, the CuMgAl complex mixture occupies no more than 10/11, 9/10, 4/5, 2/3, 1/2, 3/10, or 1/10 of the reactor volume.

At step 106, the method 100 includes introducing a $H_2S$-containing gas composition to the reactor containing the CuMgAl complex mixture under continuous agitation and passing the $H_2S$-containing gas composition through the CuMgAl complex.

In some embodiments, the $H_2S$-containing gas composition is natural gas.

In some embodiments, the $H_2S$-containing gas composition further comprises at least one hydrocarbon selected from the group consisting of methane, ethane, ethylene, propylene, propane, butane, butene, butadiene, and isobutylene. The hydrocarbon may further or alternatively include dimethyl ether, ethyl methyl ether, neopentane. The hydrocarbon may comprise at least 20, 40, 60, 80, 90, 95, 99.5, or 999.9 wt. % methane, ethane, ethylene, propylene, propane, butane, butene, butadiene, and isobutylene, based on a total weight of hydrocarbons. Other ranges are also possible.

In some embodiments, the $H_2S$-containing gas composition may further comprise $CO_2$, and the $CO_2$ may be present in 2, 5, 10, 15, 20, 25, 30, 40, 50, 60, 65, 75, 85, 100, 150, 200, 250-fold the amount, or more, of the $H_2S$ based on moles. The gas composition may further contain $N_2$, CO, Ar, $H_2$, He, $NH_3$, $O_2$, and/or $O_3$, but may exclude any or all of these.

In some embodiments, the $H_2S$ is present in the gas composition at a concentration in a range of 10 to 200 parts per million by volume (ppmv), preferably 20 to 180 ppmv, preferably 40 to 160 ppmv, further preferably 60 to 140 ppmv, more preferably 80 to 12 ppmv, or even more preferably 100 ppmv, based on a total volume of the gas composition. Other ranges are also possible.

In some embodiments, the $H_2S$-containing gas composition is introduced to the reactor at a rate of from 0.4 to 2.0 milliliters per minute (mL/min) per milligram of the graphene support, preferably 0.5 to 1.8, preferably 0.6 to 1.6, preferably 0.7 to 1.4, preferably 0.8 to 1.2, preferably 0.9 to 1.1, or 1.0 mL/min per milligram of the CuMgAl compound. Other ranges are also possible.

In some embodiments, the CuMgAl complex mixture is in contact with the $H_2S$-containing gas composition at a temperature in a range of from 15 to 40° C., preferably 20 to 35 5° C., preferably 25 to 30° C. under a pressure of 0.9 to 1.2 bar, preferable 0.95 to 1.15 bar, preferably 1.0 to 1.1 bar. Other ranges are also possible.

At step 106, the inventive method 100 may be carried out at pHs in the neutral range and/or above 4, though the efficiency of the $H_2S$ removal should be within 90% across the pH range of 2 to 13, 3 to 11, 4 to 10, 5 to 8, or 6 to 7.5. No particular considerations need to be taken regarding pH, and acceptable reaction pHs will generally be at the ambient/natural conditions of water available.

At step 108, the method 100 includes adsorbing and removing $H_2S$ from the gas composition by the CuMgAl complex mixture to form a purified gas composition. In some embodiments, molecules of the CuMgAl compound will convert $H_2S$ into metal sulfides. In some embodiments, the metal sulfides generated may act as a viscosity modified and/or a weighting agent.

As used herein, the term "breakthrough time" refers to the elapsed time between initial contact of the CuMgAl complex mixture with the $H_2S$-containing gas composition and the time at which $H_2S$ is detected in the purified gas composition. In accordance with the present disclosure, the detection limit for $H_2S$ in a gas composition is 0.5 ppm, based on a total weight of the gas composition.

As used herein, the term "saturation time" refers to the time during which the adsorbent is saturated (in equilibrium) with the adsorbate.

As used herein, the term "scavenging capacity," "adsorption capacity", and similar terms generally refer to the amount of adsorbate taken up by the adsorbent per unit mass or per unit volume of the adsorbent. In accordance with the present disclosure, the term refers to the amount of $H_2S$ taken up by the CuMgAl compound per gram of the compound.

Figure 3:
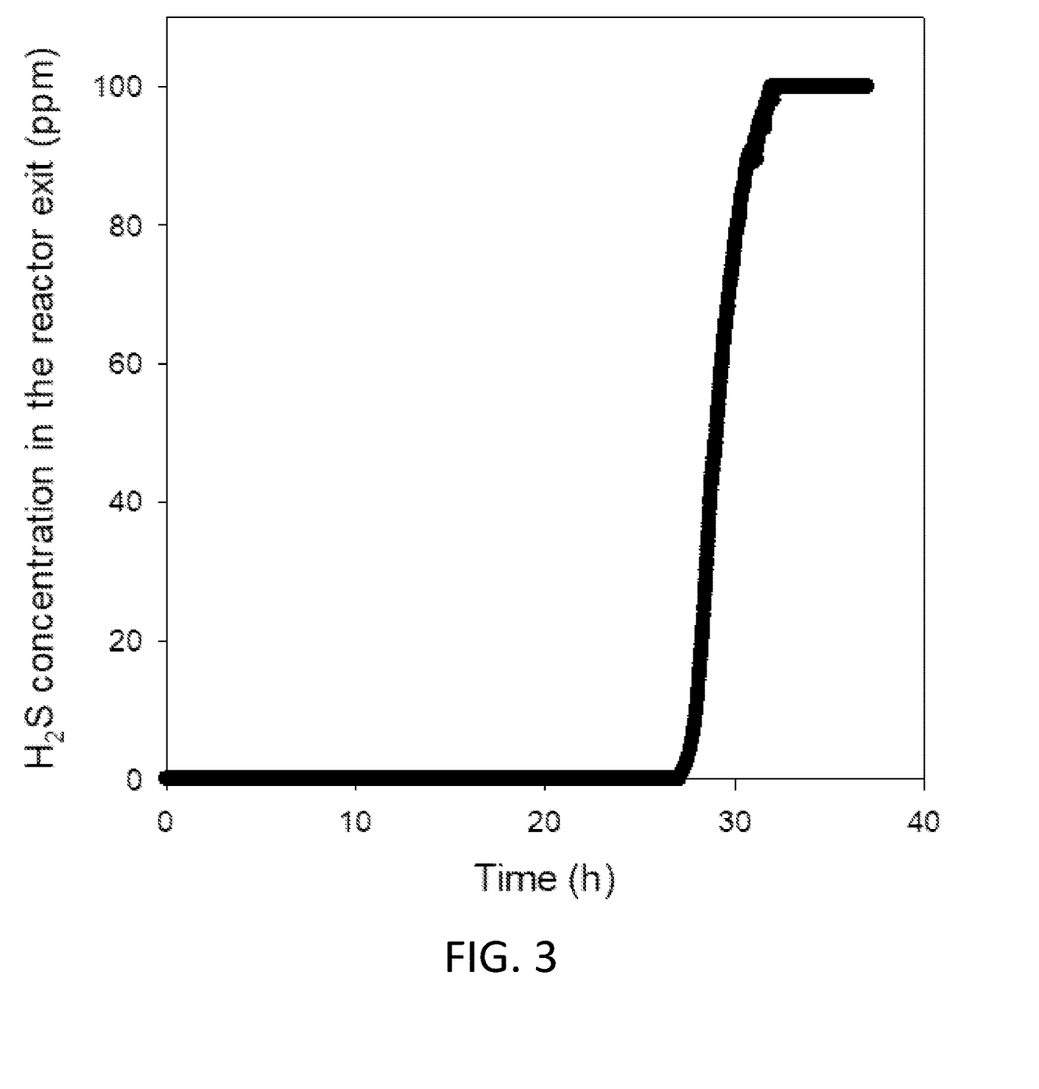
FIG. 3 illustrates a breakthrough curve for $H_2S$ adsorption using CuMgAl layered triple oxides, according to certain embodiments.

As depicted in FIG. 3, in some embodiments, the $H_2S$ content in the purified gas composition after adsorbing by CuMgAl layered triple oxides is no more than 100 ppmv, 80 ppmv, 60 ppmv, 40 ppmv, 20 ppmv, or 10 ppm, based on a total volume of the purified gas composition within 33 hours of contact with the CuMgAl complex mixture at a temperature in a range of from 15 to 40° C., and under a pressure of 0.9 to 1.2 bar. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300, 400, 500, 600, 750, or 900° C. In some embodiments, the scavenging capacity of the CuMgAl layered triple oxide at the saturation time is at least 175 mg, at least 180 mg, at least 185 mg, at least 190 mg, at least 195 mg, at least 200 mg, at least 205 mg, at least 210 mg, or at least 215 mg per gram of the CuMgAl layered triple oxide. In some embodiments, the scavenging capacity of the CuMgAl layered triple oxide at the saturation time is no more than 220 mg, no more than 215 mg, no more than 210 mg, no more than 205 mg, no more than 200 mg, no more than 195 mg, no more than 190 mg, no more than 185 mg, or no more than 180 mg per gram of the CuMgAl layered triple oxide. Other ranges are also possible.

In some preferred embodiments, the $H_2S$ content in the purified gas composition after adsorbing by CuMgAl layered triple oxides is no more than 5 ppmv, 4 ppmv, 3 ppmv, 2 ppmv, 1 ppmv, or 0.5 ppmv, based on a total volume of the purified gas composition within 28 hours of contact with the CuMgAl complex mixture at a temperate in a range of from 15 to 40° C., and under a pressure of 0.9 to 1.2 bar. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300, 400, 500, 600, 750, or 900° C. In some embodiments, the scavenging capacity of the CuMgAl layered triple oxide at the breakthrough time is at least 160 mg, at least 165 mg, at least 170 mg, at least 175 mg, at least 180 mg, at least 185 mg, at least 190 mg, at least 195 mg, or at least 200 mg per gram of the CuMgAl layered triple oxide. In some embodiments, the scavenging capacity of the CuMgAl layered triple oxide at the breakthrough time is no more than 205 mg, no more than 200 mg, no more than 195 mg, no more than 190 mg, no more than 185 mg, no more than 180 mg, no more than 175 mg, no more than 170 mg, or no more than 165 mg per gram of the CuMgAl layered triple oxide. Other ranges are also possible.

Figure 4:
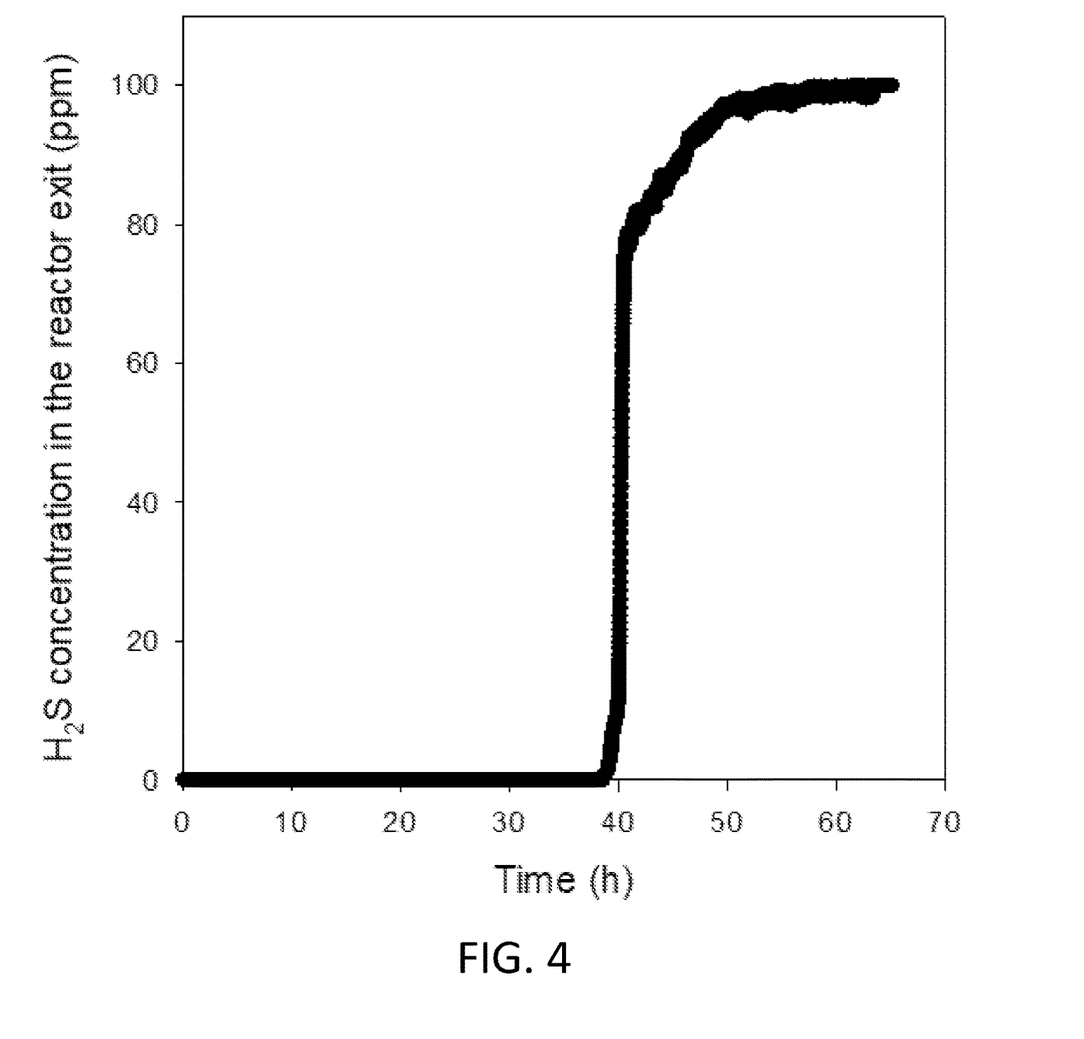
FIG. 4 illustrates a breakthrough curve for $H_2S$ adsorption using CuMgAl layered triple hydroxides, according to certain embodiments.

As depicted in FIG. 4, in some embodiments, the $H_2S$ content in the purified gas composition after adsorbing by CuMgAl layered triple hydroxides is no more than 100 ppmv, 80 ppmv, 60 ppmv, 40 ppmv, 20 ppmv, or 10 ppm, based on a total volume of the purified gas composition within 64 hours of contact with the CuMgAl complex mixture at a temperate in a range of from 15 to 40° C., and under a pressure of 0.9 to 1.2 bar. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300, 400, 500, 600, 750, or 900° C. In some embodiments, the scavenging capacity of the CuMgAl layered triple hydroxide at the saturation time is at least 260 mg, at least 265 mg, at least 270 mg, at least 275 mg, at least 280 mg, at least 285 mg, at least 290 mg, at least 295 mg, or at least 300 mg per gram of the CuMgAl layered triple hydroxide. In some embodiments, the scavenging capacity of the CuMgAl layered triple hydroxide at the saturation time is no more than 305 mg, no more than 300 mg, no more than 295 mg, no more than 290 mg, no more than 285 mg, no more than 280 mg, no more than 275 mg, no more than 270 mg, or no more than 265 mg per gram of the CuMgAl layered triple hydroxide. Other ranges are also possible.

In some preferred embodiments, the $H_2S$ content in the purified gas composition after adsorbing by CuMgAl layered triple hydroxides is no more than 5 ppmv, 4 ppmv, 3 ppmv, 2 ppmv, 1 ppmv, or 0.5 ppmv, based on a total volume of the purified gas composition within 39 hours of contact with the CuMgAl complex mixture at a temperate in a range of from 15 to 40° C., and under a pressure of 0.9 to 1.2 bar. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300, 400, 500, 600, 750, or 900° C. In some embodiments, the scavenging capacity of the CuMgAl layered triple hydroxide at the breakthrough time is at least 240 mg, at least 245 mg, at least 250 mg, at least 255 mg, at least 260 mg, at least 265 mg, at least 270 mg, at least 275 mg, or at least 280 mg per gram of the CuMgAl layered triple hydroxide. In some embodiments, the scavenging capacity of the CuMgAl layered triple hydroxide at the breakthrough time is no more than 285 mg, no more than 280 mg, no more than 275 mg, no more than 270 mg, no more than 265 mg, no more than 260 mg, no more than 255 mg, no more than 250 mg, or no more than 245 mg per gram of the CuMgAl layered triple hydroxide. Other ranges are also possible.

According to a second aspect, the present disclosure relates to a method of making the CuMgAl compound, and its application in a continuous stirred tank reactor process for the desulfurization of sour gases and liquid hydrocarbon fuels. In some embodiments, the CuMgAl compound incudes a CuMgAl layered triple hydroxide, a CuMgAl layered triple oxide, or a mixture thereof.

Figure 5:
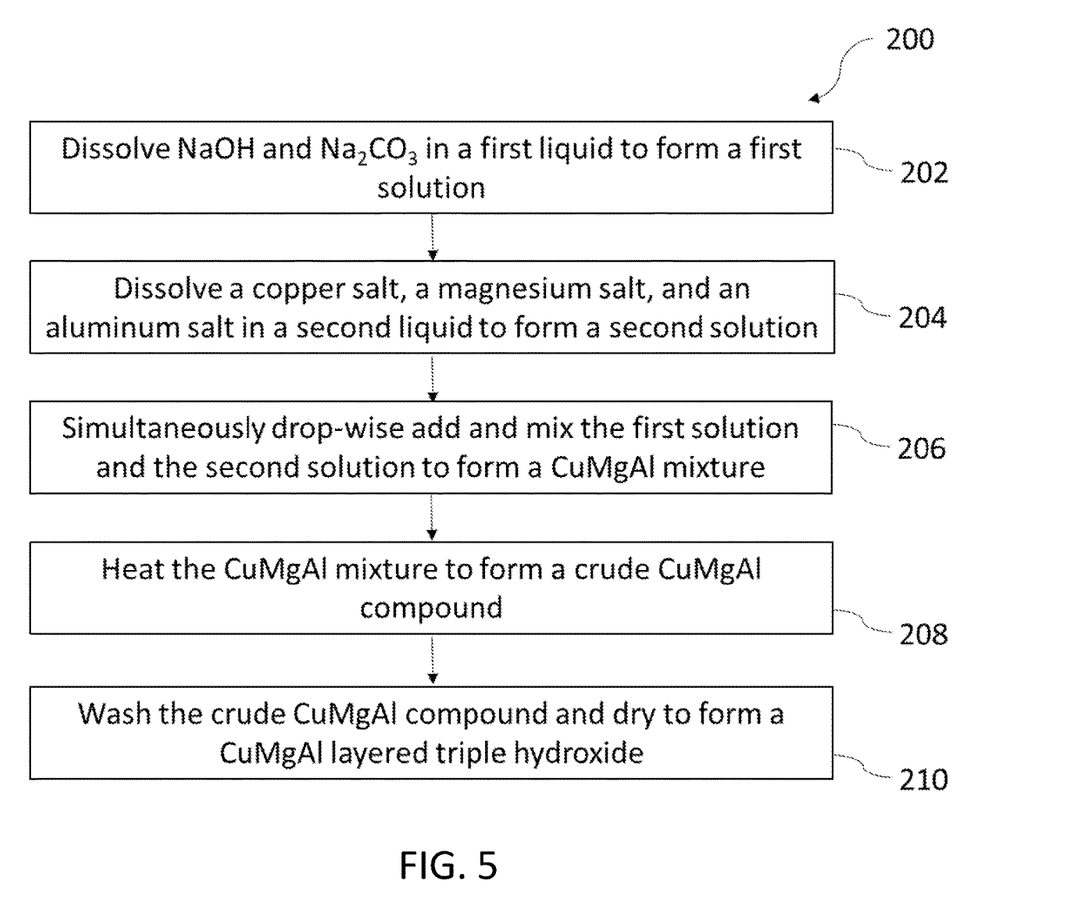
FIG. 5 is a schematic flow diagram of a method of making a CuMgAl compound, according to certain embodiments.

Referring to FIG. 5, the method of making the CuMgAl compound includes (i) dissolving NaOH and $Na_2CO_3$ in a first liquid to form a first solution, (ii) dissolving a copper salt, a magnesium salt, and an aluminum salt in a second liquid to form a second solution, (iii) simultaneously drop-wise adding and mixing the first solution and the second solution to form a CuMgAl mixture, (iv) heating the CuMgAl mixture to form a crude CuMgAl compound, and (v) washing the crude CuMgAl compound and drying to form a CuMgAl layered triple hydroxide.

At step 202, the method 200 includes dissolving NaOH and $Na_2CO_3$ in a first liquid to form a first solution. In some embodiments, the liquid is selected from the group consisting of tap water, ground water, distilled water, deionized water, hard water, and fresh water. In some preferred embodiments, the liquid may be distilled water, and deionized water. In some embodiments, NaOH and $Na_2CO_3$ may be replaced by another alkali metal base which has at least one metal ion selected from the group consisting of Li, K, Ca, or a combination thereof. In some embodiments, NaOH is present in the first solution at a concentration of 150 to 550 millimolar (mM), preferably 250 to 500 mM, preferably 300 to 450 mM, preferably 310 to 350 mM, or more preferably 335 mM. In some embodiments, $Na_2CO_3$ is present in the first solution at a concentration of 5 to 50 mM, preferably 10 to 45 mM, preferably 15 to 40 mM, preferably 20 to 35 mM, or more preferably 28 mM. Other ranges are also possible.

At step 204, the method 200 includes dissolving a copper salt, a magnesium salt, and an aluminum salt in a second liquid to form a second solution. In some embodiments, the liquid is selected from the group consisting of tap water, ground water, distilled water, hard water, and fresh water. In some preferred embodiments, the liquid may be distilled water, and deionized water. In some embodiments, the copper salt comprises $Cu(NO_3)_2$, $CuF_2$, $CuCl_2$, $CuBr_2$, $CuCO_3$, $Cu(HCO_3)_2$, $CuSO_4$, $CuSiF_6$, $CuSeO_3$, $CuSeO_4$, $Cu(ClO_4)_2$, $Cu(ClO_3)_2$, $Cu(IO_3)_2$, $Cu(HCO_2)_2$, $Cu(BF_4)_2$, $Cu(O_2CCH_3)_2$, $[C_6H_{11}(CH_2)_3CO_2]_2Cu$, $Cu_2P_2O_7$, $C_{26}H_{34}O_6Cu$, $Cu(O_2C[CHOH]_nCH_2OH)$ where n is 2, 3, or 4, $[Cu(N_3)4]SO_4$, or its hydrate, or a mixture of two or more of any of these. In some preferred embodiments, the copper salt is $Cu(NO_3)_2$ or $Cu(NO_3)_2 \cdot 3H_2O$. In some embodiments, the magnesium salt comprises magnesium fluoride, magnesium chloride, magnesium bromide, magnesium iodide, magnesium lactate, magnesium phosphate, magnesium sulfate, magnesium sulfite, magnesium carbonate, magnesium oxide, magnesium nitrate, magnesium borate, magnesium acetate, magnesium citrate, magnesium gluconate, magnesium maleate, magnesium succinate, magnesium malate, magnesium taurate, magnesium orotate, magnesium glycinate, magnesium naphthenate, magnesium acetylacetonate, magnesium formate, magnesium hydroxide, magnesium stearate, magnesium hexafluorsilicate, magnesium salicylate, or its hydrate, or a mixture of two or more of any of these. In some preferred embodiments, the magnesium salt is $Mg(NO_3)_2$ or $Mg(NO_3)_2 \cdot 6H_2O$. In some embodiments, the aluminum salt comprises aluminum chloride, aluminum nitrate, aluminium hydroxide, aluminum sulfate, or its hydrate, or a mixture of two or more of any of these. In some preferred embodiments, the aluminum salt is $Al(NO_3)_3$ or $Al(NO_3)_3 \cdot 9H_2O$. In some embodiments, copper ion ($Cu^{2+}$) of the copper salt is present in the second solution at a concentration of 50 to 250 mM, preferably 75 to 225 mM, preferably 100 to 200 mM, preferably 125 to 175 mM, or more preferably 152.2 mM. In some embodiments, magnesium ion ($Mg^{2+}$) of the magnesium salt is present in the second solution at a concentration of 1 to 50 mM, preferably 5 to 40 mM, preferably 10 to 30 mM, preferably 15 to 20 mM, or more preferably 15.2 mM. In some embodiments, aluminum ion ($Al^{3+}$) of the aluminum salt is present in the second solution at a concentration of 5 to 100 mM, preferably 20 to 90 mM, preferably 40 to 70 mM, preferably 50 to 60 mM, or more preferably 55.8 mM. In a more preferred embodiment, a molar ratio of $Cu^{2+}:Mg^{2+}:Al^{3+}$ is 10:1:3.7.

At step 206, the method 200 includes simultaneously drop-wise adding and mixing the first solution and the second solution to form a CuMgAl mixture. In some embodiments, the CuMgAl mixture has a pH in a range of about 7.5 to about 13, about 8 to about 12.5, about 8.5 to about 12, about 9 to about 11.5, about 9.5 to about 11, about 10 to about 10.5, preferably about 10.5 by adjusting the addition rates of the first solution and the second solution. In some embodiments, the addition rate of the first solution and the second solution ranges from 1 to 1000 drops per minute (drop/min), preferably from 10 to 800 drop/min, preferably from 30 to 500 drop/min, preferably from 60 to 300 drop/min, preferably from 80 to 200 drop/min, or 100 drop/min. After completion of the addition, in some embodiments, the CuMgAl mixture is further mixed at ambient temperature for at least 5 minutes, at least 15 minutes, at least 30 minutes, at least 60 minutes, or at least 120 minutes, and for no more than 150 minutes, no more than 120 minutes, no more than 90 minutes, no more than 60 minutes, no more than 30 minutes, or no more than 15 minutes. Other ranges are also possible.

At step 208, the method 200 includes heating the CuMgAl mixture to form a crude CuMgAl compound. In some embodiments, the CuMgAl mixture is heated in an oven at a temperature in a range of 80 to 200° C., 85 to 160° C., preferably 90 to 150° C., further preferably 100 to 140° C., preferably 110 to 130° C., and more preferably 120° C. for 6 to 72 hours, 12 to 48 hours, 18 to 36 hours, or preferably 24 hours. Other ranges are also possible.

At step 210, the method 200 includes washing the crude CuMgAl compound and drying to form a CuMgAl layered triple hydroxide. In some embodiments, the crude CuMgAl compound is washed with distilled water to remove all impurities for at least 1 time, at least 3 times, at least 5 times, at least 10 times, or at least 30 times before drying. In some further embodiments, drying is conducted in an oven at a temperature in a range of 50 to 130° C., preferably 60 to 110° C., preferably 70 to 90° C., or more preferably 90° C. for 6 to 72 hours, 12 to 48 hours, 18 to 36 hours, or preferably 24 hours to afford the CuMgAl layered triple hydroxide. Other ranges are also possible.

In accordance with the present disclosure, the method 200 further includes calcining the CuMgAl layered triple hydroxide to form a CuMgAl layered triple oxide. In some embodiments, the CuMgAl layered triple hydroxide can be calcined in air or inert gas at temperatures ranging from about 200° C. to about 400° C., or from about 400° C. to about 850° C., or about 1000° C., depending on the nature of the calcining atmosphere, for periods of time ranging from 1 to 48 hours or more, preferably 2 to 24 hours or more, or preferably 2 to 4 hours to produce the CuMgAl layered triple oxide. Other ranges are also possible.

Additionally, the method 200 may further include impregnating the CuMgAl compound to a support. The impregnating comprises (i) dissolving the CuMgAl compound in an aqueous or organic solution, (ii) adding the CuMgAl-containing solution to a support to form a crude supported-CuMgAl mixture, optionally having the same pore volume (or within 50, 33, 25, 15, 10, or 5%) as the volume of the added solution, and (iii) allowing capillary action to draw the solution into the pores. The crude supported-CuMgAl mixture can then be dried and calcined to drive off the volatile components within the solution, depositing the CuMgAl compound on the exterior surface of a support and within pores of a porous support. Maximum loading is generally limited by the solubility of the CuMgAl compound in the solution. Concentration profiles of impregnated compound(s) depend on mass transfer within the pores during impregnation and drying.

Aspects of the invention provide two or three-phase processes for scavenging $H_2S$ from a $H_2S$-containing gas composition, i.e., a gas composition comprising a hydrocarbon and $H_2S$, such as a sour natural gas, biogas, refinery gas, syn gas, cracking off-gas or at least partially purified methane, ethane, ethylene, propylene, propane, butane, butene, butadiene, and isobutylene gas(es). Gas phases may comprise $H_2S$, $CO_2$, and a hydrocarbon, e.g., methane. Liquid phases within the invention, when present, may comprise or consist essentially of water, i.e., at least 75, 80, 85, 90, 91, 92, 92.5, 93, 94, 95, 96, 97, 97.5, 98, 99 99.1, 99.5, 99.9, 99.99, 99.999, or 99.9999 wt. % of a total weight of the liquid phase weight being water. Solid phases generally contain a CuMgAl compound or a CuMgAl compound impregnated on a support. The gas(es) may be continuously bubbled through a stirred tank reactor, contacting with the CuMgAl compound, in an air or at least partially inert atmosphere or within the bulk of liquid phase, e.g., water, an aqueous mixture/solution, an organic phase.

According to an inventive two or three-phase processes for scavenging $H_2S$ from a $H_2S$-containing gas composition, in certain aspects, a $Cu_{0.68}Mg_{0.068}Al_{0.252}$ layered triple hydroxide present in an aqueous media at a concentration of 1 mg/mL is in contact with the gas composition comprising 100 ppmv of $H_2S$ at a rate of 80 mL/min in a stirred tank reactor, having a breakthrough time of from 33 to 43 hours, and a saturation time of from 58 to 68 hours.

According to another inventive two or three-phase processes for scavenging $H_2S$ from a $H_2S$-containing gas composition, in certain aspects, a $Cu_{0.68}Mg_{0.068}Al_{0.252}$ layered triple oxide present in the aqueous media at a concentration of 1 mg/mL is in contact with the gas composition comprising 100 ppmv of $H_2S$ at a rate of 80 mL/min in a stirred tank reactor, having a breakthrough time of from 22 to 32 hours, and a saturation time of from 27 to 37 hours.

The examples below are intended to further illustrate protocols for preparing, characterizing, and using the CuMgAl compound and for performing the method described above and are not intended to limit the scope of the claims.

Where a numerical limit or range is stated herein, the endpoints are included. Also, all values and subranges within a numerical limit or range are specifically included as if explicitly written out.

EXAMPLES

The following examples describe and demonstrate a process for removing hydrogen sulfide ($H_2S$) from a $H_2S$-containing gas composition described herein. The examples are provided solely for illustration and are not to be construed as limitations of the present disclosure, as many variations thereof are possible without departing from the spirit and scope of the present disclosure.

Example 1

CuMgAl layered triple oxides was obtained from CuMgAl layered triple hydroxides. The CuMgAl layered triple hydroxide was synthesized using a hydrothermal method as follows. First, solution A was prepared by dissolving certain amounts of NaOH and $Na_2CO_3$ in a specific volume of distilled water to give 335 and 28 mM NaOH and $Na_2CO_3$, respectively. In parallel, solution B was prepared by dissolving certain amounts of $Cu(NO_3)_2 \cdot 3H_2O$, $Mg(NO_3)_2 \cdot 6H_2O$, and $Al(NO_3)_3 \cdot 9H_2O$ in a specific volume of distilled water to give 152.2, 15.2, and 55.8 mM $Cu^{2+}$, $Mg^{2+}$, and $Al^{3+}$, respectively. The total molar concentration of $Cu^{2+}$, $Mg^{3+}$ and $Al^{3+}$ is 223.2 mM. The molar ratio of $Cu^{2+}:Mg^{2+}:Al^{3+}$ is 10:1:3.7. After the preparation of solutions A and B, the two solutions were simultaneously added drop-wise to a beaker. The pH of the mixture in the beaker was kept at 10.5±0.5 via controlling the addition rate of solutions A and B. The mixture in the beaker was continuously stirred at room temperature under ambient air during the addition of solutions A and B; the mixture was further stirred for additional 30 minutes after the addition is complete. Then, the produced suspension was transferred into autoclave reactor and placed in an oven at 120° C. for 24 h. The crude catalyst was, then, washed several times with distilled water in order to remove impurities. The solid paste was dried overnight at 80° C. to give the purified solid CuMgAl layered triple hydroxides. The solid CuMgAl layered triple hydroxides was, then, calcined at 500° C. for 3 hours to yield CuMgAl layered triple oxides.

Example 2

The CuMgAl layered triple oxides catalyst is dispersed in water using stirring at 700 rpm. Sour natural gas stream containing $H_2S$ (100.2 ppmv) and the balance methane is introduced at 80 mL/min. The gas exiting the reactor is sent to an $H_2S$ gas detector with a detection limit of 0.5 ppm. The exit gas is monitored and the concentration of $H_2S$ in the treated gas is continuously recorded.

Example 3

The CuMgAl layered triple hydroxides catalyst is dispersed in water using stirring at 700 rpm. Sour natural gas stream containing $H_2S$ (100.2 ppmv) and the balance methane is introduced at 80 mL/min. The gas exiting the reactor is sent to an $H_2S$ gas detector with a detection limit of 0.5 ppm. The exit gas is monitored and the concentration of $H_2S$ in the treated gas is continuously recorded.

Example 4: The XRD Pattern of the CuMgAl Layered Triple Oxides

FIG. 2 shows $2\theta$ peaks in the XRD of inventive CuMgAl layered triple oxides. The diffraction peaks are centered at $2\theta$ of 32.73, 35.73, 38.94, 48.78, 53.85, 58.41, 61.77, 66.24, 68.34, 72.54, and 75.45, respectively. The intensities of these peaks are, respectively, 7057, 71988, 79270, 17082, 3891, 6764, 10050, 13838, 8525, 3097, and 4220 cps, respectively.

Example 5: The Breakthrough Curve for $H_2S$ Adsorption Using CuMgAl Layered Triple Oxides FIG. 3 shows the breakthrough curve obtained using the CuMgAl layered triple oxides catalyst. The breakthrough time is 1625 minutes (27.08 hours) while the saturation time is 1925 minutes (32.08 hours). The $H_2S$ scavenging capacities at the breakthrough and the saturation times are 180.7 and 195.1 mg $H_2S$/g catalyst, respectively. The CuMgAl layered triple oxides catalyst is dispersed in an aqueous medium (i.e., distilled water, pH 7) via magnetic stirring. The stirring rate is 700 rpm. The loading of the CuMgAl layered triple oxides catalyst is 100 mg. The reactor volume is 150 mL and the liquid level in the reactor is ⅔ of the total capacity (i.e., 100 mL). The feed sour natural gas contained 100.2 ppmv $H_2S$ in methane and is fed to the stirred tank reactor at flow rate of 80 mL/min. The scavenging process was conducted at room temperature and atmospheric pressure.

Example 6: The Breakthrough Curve for $H_2S$ Adsorption Using CuMgAl Layered Triple Hydroxides FIG. 4 shows the breakthrough curve obtained using the CuMgAl layered triple hydroxides catalyst. The breakthrough time is 2315 minutes (38.58 hours) while the saturation time is 3818 minutes (63.63 hours). The $H_2S$ scavenging capacities at the breakthrough and the saturation times are 257.6 and 277.9 mg $H_2S$/g catalyst, respectively. The CuMgAl layered triple hydroxides catalyst is dispersed in an aqueous medium (i.e., distilled water, pH 7) via magnetic stirring. The stirring rate is 700 rpm. The loading of the CuMgAl layered triple hydroxides catalyst is 100 mg. The reactor volume is 150 mL and the liquid level in the reactor is ⅔ of the total capacity (i.e., 100 mL). The feed sour natural gas contained 100.2 ppmv $H_2S$ in methane and is fed to the stirred tank reactor at flow rate of 80 mL/min. The scavenging process was conducted at room temperature and atmospheric pressure.

Example 7: Comparison of CuMgAl Layered Triple Oxides and CuMgAl Layered Triple Hydroxides Referring to FIGS. 3 and 4, on one hand, the breakthrough time of CuMgAl layered triple hydroxides catalyzed desulfurization of sour gases is at least 11 hours longer than that of CuMgAl layered triple oxides catalyzed desulfurization process. On the other hand, the saturation time of CuMgAl layered triple hydroxides catalyzed desulfurization of sour gases is also longer than that of CuMgAl layered triple oxides catalyzed desulfurization process. Both indicates that the CuMgAl layered triple hydroxide catalyst is more effective towards $H_2S$ removal under the same conditions of temperature, pressure, catalyst loading, and gas flowrate, etc.

It is also noteworthy to mention that the CuMgAl layered triple hydroxide/oxide catalyst loading can be adjusted depending on the $H_2S$ concentration in the $H_2S$-containing gas composition as well as the sour gases flow rate. The loading of CuMgAl layered triple hydroxide/oxide catalyst can be high such that it can form a thick reaction slurry (i.e., slurry phase reaction). Additionally, the stirring speed, medium pH, volume, reaction temperature, pressure, and gas inlet flow rate can be adjusted to meet the reactor configurations and design parameters.

Example 8: Application in Sour Oil Desulfurization

Sour oil can also be treated by the method described in the present disclosure. Firstly, the sour oil is emulsified in water to form an emulsion. Then, the CuMgAl layered triple hydroxide/oxide is mixed and suspended in the emulsion. Additionally, the contact between the sulfur-bearing components of the sour oil in the emulsion and the CuMgAl layered triple hydroxide/oxide will promote the desulfurization of sour oil.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A process for removing hydrogen sulfide ($H_2S$) from a $H_2S$-containing gas composition, comprising:
    charging a liquid to a reactor under continuous agitation;
    dispersing particles of a CuMgAl compound in the liquid to form a CuMgAl complex mixture;
    continuously agitating the CuMgAl complex mixture;
    introducing the $H_2S$-containing gas composition to the reactor containing the CuMgAl complex mixture under continuous agitation and passing the $H_2S$-containing gas composition through the CuMgAl complex mixture;
    adsorbing and removing $H_2S$ from the gas composition by the CuMgAl complex mixture to form a purified gas composition,
    wherein the CuMgAl compound is a $Cu_{0.68}Mg_{0.068}Al_{0.252}$ layered triple hydroxide, in which x=0.68 and y=0.252.

2. The process of claim 1, wherein the CuMgAl compound is supported on at least one support selected from the group consisting of an alumina, a carbon nanotube, an activated carbon, a metal organic framework (MOF), a zeolitic imidazolate framework (ZIF), and a covalent organic polymer (COP).

3. The process of claim 2, wherein the CuMgAl compound supported on the at least one support comprises at least 15 wt. % alumina, based on a total weight of the CuMgAl compound and the support.

4. The process of claim 1, wherein the particles of the CuMgAl compound have a mean particle size in a range of 5 to 150 nm and are on at least one support selected from the group consisting of an exterior surface of a support and within pores of a porous support.

5. The process of claim 1, wherein the liquid is an aqueous media selected from the group consisting of tap water, ground water, distilled water, deionized water, saltwater, hard water, fresh water, and wastewater.

6. The process of claim 1, wherein the reactor is a stirred tank reactor in the form of a vertical cylindrical reactor containing at least one propeller agitator disposed therein, wherein the vertical cylindrical reactor has a bottom portion, a vertically oriented cylindrical body portion and a top portion, wherein the bottom portion is cone shaped or pyramidal, wherein a plurality of recirculation tubes fluidly connects the bottom portion of the vertical cylindrical reactor with the body portion of the vertical cylindrical reaction.

7. The process of claim 1, wherein the reactor further comprises is selected from the group consisting of a packed bed reactor, a slurry reactor, and a bubble column reactor.

8. The process of claim 1, wherein the $H_2S$-containing gas composition is natural gas.

9. The process of claim 8, wherein the $H_2S$-containing gas composition further comprises at least one hydrocarbon selected from the group consisting of methane, ethane, ethylene, propylene, propane, butane, butene, butadiene, and isobutylene.

10. The process of claim 9, wherein the hydrocarbon is methane.

11. The process of claim 1, wherein the $H_2S$ is present in the gas composition at a concentration in a range of 10 to 200 parts per million by volume (ppmv) based on a total volume of the gas composition.

12. The process of claim 1, wherein the $H_2S$-containing gas composition is introduced to the reactor at a rate of 0.4 to 2.0 milliliters per minute (mL/min) per milligram of the CuMgAl compound.

13. The process of claim 1, wherein the CuMgAl compound is present in the liquid at a concentration in a range of from 0.5 to 2 milligrams per milliliter (mg/mL).

14. The process of claim 1, wherein the CuMgAl complex mixture is in contact with the $H_2S$-containing gas composition at a temperature in a range of from 15 to 40° C. and under a pressure of 0.9 to 1.2 bar.

15. The process of claim 1, wherein the $Cu_{0.68}Mg_{0.068}Al_{0.252}$ layered triple hydroxide present in the aqueous media at a concentration of 1 mg/mL is in contact with the gas composition comprising 100 ppmv of $H_2S$ at a rate of 80 mL/min in the stirred tank reactor, having a breakthrough time of from 33 to 43 hours, and a saturation time of from 58 to 68 hours.

16. A process for removing hydrogen sulfide ($H_2S$) from a $H_2S$-containing gas composition, comprising:
  charging a liquid to a reactor under continuous agitation;
  dispersing particles of a CuMgAl compound in the liquid to form a CuMgAl complex mixture;
  continuously agitating the CuMgAl complex mixture;
  introducing the $H_2S$-containing gas composition to the reactor containing the CuMgAl complex mixture under continuous agitation and passing the $H_2S$-containing gas composition through the CuMgAl complex mixture;
  adsorbing and removing $H_2S$ from the gas composition by the CuMgAl complex mixture to form a purified gas composition,
  wherein the CuMgAl compound is a $Cu_{0.68}Mg_{0.068}Al_{0.252}$ layered triple oxide.

17. The process of claim 16, wherein the $Cu_{0.68}Mg_{0.068}Al_{0.252}$ layered triple oxide present in the aqueous media at a concentration of 1 mg/mL is in contact with the gas composition comprising 100 ppmv of $H_2S$ at a rate of 80 mL/min in the stirred tank reactor, having a breakthrough time of from 22 to 32 hours, and a saturation time of from 27 to 37 hours.

18. A process for removing hydrogen sulfide ($H_2S$) from a $H_2S$-containing gas composition, comprising:
  charging a liquid to a reactor under continuous agitation;
  dispersing particles of a CuMgAl compound in the liquid to form a CuMgAl complex mixture;
  continuously agitating the CuMgAl complex mixture;
  introducing the $H_2S$-containing gas composition to the reactor containing the CuMgAl complex mixture under continuous agitation and passing the $H_2S$-containing gas composition through the CuMgAl complex mixture;
  adsorbing and removing $H_2S$ from the gas composition by the CuMgAl complex mixture to form a purified gas composition,
  wherein the CuMgAl compound has a delaminated structure comprising charged crystalline particles, in which a distance between laminated layers is in a range of 0.5 to 5 nm wherein the CuMgAl compound is a $Cu_{0.68}Mg_{0.068}Al_{0.252}$ layered triple oxide.

* * * * *